United States Patent
Chittigala et al.

(10) Patent No.: US 10,419,390 B2
(45) Date of Patent: Sep. 17, 2019

(54) USING DYNAMIC HOST CONFIGURATION PROTOCOL TO PROTECT DATA

(71) Applicant: International Business Machines Corporation, Armonk, NY (US)

(72) Inventors: Jes Kiran Chittigala, Hyderabad (IN); Prabhanjan Gururaj, Bangalore (IN); Suraj S. Shirolikar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 15/193,162

(22) Filed: Jun. 27, 2016

(65) Prior Publication Data
US 2017/0374020 A1 Dec. 28, 2017

(51) Int. Cl.
*H04L 29/12* (2006.01)
*H04L 27/28* (2006.01)

(52) U.S. Cl.
CPC .............................. *H04L 61/2015* (2013.01)

(58) Field of Classification Search
CPC ............. H04L 41/0803; H04L 41/0806; H04L 41/0816; H04L 65/4084; H04L 61/2069; H04L 67/1002; H04L 69/329; H04L 2001/0093; H04L 2001/0097; H04L 63/1408; H04L 67/1008; H04L 61/2007; H04L 47/125; H04L 67/1012; H04L 12/413; H04L 67/24; H04L 69/22; H04W 92/02
USPC ........ 709/223, 225, 227, 228; 370/400, 432; 711/154
See application file for complete search history.

(56) References Cited

U.S. PATENT DOCUMENTS

| | | | | |
|---|---|---|---|---|
| 6,240,464 | B1 * | 5/2001 | Fijolek | H04L 12/2801 370/351 |
| 6,934,268 | B1 * | 8/2005 | Hedlund | H04W 52/221 370/311 |
| 7,243,142 | B2 | 7/2007 | Poirot et al. | |
| 2006/0294447 | A1 * | 12/2006 | Mackey | H03M 13/00 714/752 |
| 2007/0091821 | A1 * | 4/2007 | Seo | H04L 29/12254 370/254 |
| 2009/0106213 | A1 * | 4/2009 | Danforth | H04L 29/12028 |
| 2010/0306573 | A1 | 12/2010 | Gupta | |

(Continued)

OTHER PUBLICATIONS

W Bolton; Parity Method for Error Detection; 1999; Mechatronics: Electronic Control Systems in Mechanical and Electrical Engineering; 2nd Edition (Year: 1999).*

(Continued)

*Primary Examiner* — Backhean Tiv
*Assistant Examiner* — Linh T Nguyen
(74) *Attorney, Agent, or Firm* — Alexander G. Jochym (57) ABSTRACT

Two or more nodes in a cluster are determined. The cluster manages one or more resources found on a device. An indication from a first node of the two or more nodes is received. The indication includes a request for an IP lease for the first node. A parity bit setting for the first node is determined. Responsive to determining the parity bit setting of the first node being set to one, an IP lease to the first node is indicated. Responsive to determining the parity bit setting of the first node being set to zero, a denial of an IP lease to the first node is indicated.

14 Claims, 3 Drawing Sheets

(56) References Cited

U.S. PATENT DOCUMENTS

| | | | | |
|---|---|---|---|---|
| 2011/0299613 A1* | 12/2011 | Duff | H04L 43/10 | 375/260 |
| 2012/0129540 A1* | 5/2012 | Hakola | H04W 72/042 | 455/450 |
| 2013/0201941 A1* | 8/2013 | Classon | H04L 5/0048 | 370/329 |
| 2014/0192744 A1* | 7/2014 | Zhou | H04B 7/024 | 370/329 |
| 2015/0046509 A1* | 2/2015 | Logue | G06Q 10/107 | 709/202 |
| 2015/0095486 A1* | 4/2015 | Gossain | H04L 61/2046 | 709/224 |
| 2015/0319737 A1* | 11/2015 | Cheng | H04W 76/14 | 370/329 |
| 2016/0036770 A1* | 2/2016 | Chatterjee | H04L 61/2015 | 709/203 |
| 2016/0294544 A1* | 10/2016 | Jang | H04L 7/048 | |
| 2016/0366219 A1* | 12/2016 | Ohana | H04L 67/1095 | |

OTHER PUBLICATIONS

"Split policy", IBM Knowledge Center, Printed Mar. 30, 2016, 1 page, <http://www.ibm.com/support/knowledgecenter/SSPHQG_7.1.0/com.ibm.powerha.concepts/ha_concepts_splitpolicy.htm>.

\* cited by examiner

USING DYNAMIC HOST CONFIGURATION PROTOCOL TO PROTECT DATA

BACKGROUND OF THE INVENTION

The present invention relates generally to the field of node clusters, and more particularly to protecting data written by nodes.

Dynamic Host Configuration Protocol (DHCP) is a standardized network protocol used on Internet Protocol (IP) networks for dynamically distributing network configuration parameters, such as IP addresses for interfaces and services. With DHCP, computers request IP addresses and networking parameters automatically from a DHCP server, reducing the need for a network administrator or a user to configure these settings manually.

SUMMARY

Embodiments of the present invention include a method, computer program product, and system for preventing data corruption. In one embodiment, two or more nodes in a cluster are determined. The cluster manages one or more resources found on a device. An indication from a first node of the two or more nodes is received. The indication includes a request for an IP lease for the first node. A parity bit setting for the first node is determined. Responsive to determining the parity bit setting of the first node being set to one, an IP lease to the first node is indicated. Responsive to determining the parity bit setting of the first node being set to zero, a denial of an IP lease to the first node is indicated.

DETAILED DESCRIPTION

Embodiments of the present invention recognize that there is an increased risk for data corruption if more than one node in a node cluster writes the same data to the same disk. Advantages of some embodiments of the invention include: (i) a method to detect and identify a faulty node, (ii) a method to transfer resource ownership, and (iii) a method to prevent the corruption of data.

Embodiments of the invention utilize servers with DHCP services to identify faulty nodes and cluster splits. By using parity bits to invalidate IP lease times of nodes, corruption of data may be prevented by preventing more than one node writing the same information to the same information repository.

The present invention will now be described in detail with reference to the Figures.

Figure 1:
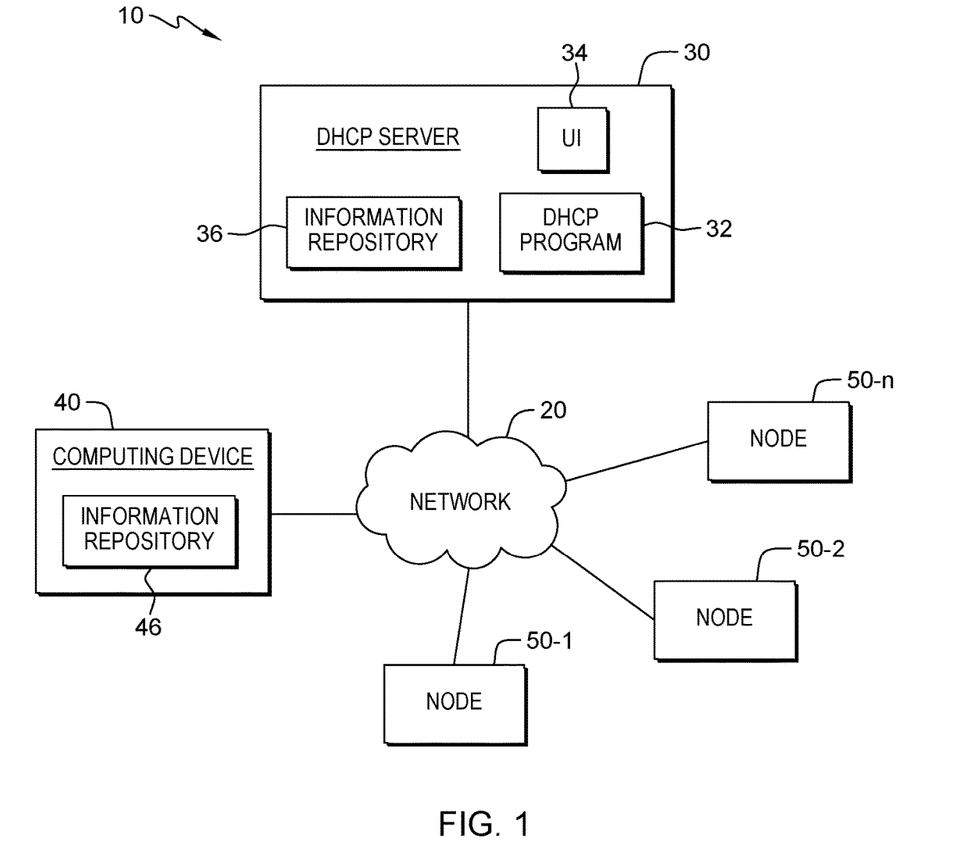
FIG. 1 a functional block diagram illustrating a computing environment, in accordance with an embodiment of the present invention.

FIG. 1 depicts a diagram of computing environment 10 in accordance with one embodiment of the present invention. FIG. 1 provides an illustration of one embodiment and does not imply any limitations with regard to the environments in which different embodiments may be implemented.

In the depicted embodiment, computing environment 10 includes DHCP server 30, computing device 40, node 50-1, node 50-2, and node 50-n interconnected over network 20. Network 20 may be a local area network (LAN), a wide area network (WAN) such as the Internet, any combination thereof, or any combination of connections and protocols that will support communications between DHCP server 30, computing device 40, node 50-1, node 50-2, and node 50-n in accordance with embodiments of the present invention. Network 20 may include wired, wireless, or fiber optic connections. Computing environment 10 may include additional computing devices, servers, or other devices not shown.

DHCP server 30 may be a management server, a web server, or any other electronic device or computing environment capable of processing computer readable program instructions, and receiving and sending data over network 20. In other embodiments, DHCP server 30 may be a laptop computer, tablet computer, personal computer (PC), a desktop computer, or any programmable electronic device capable of communicating with computing device 40, node 50-1, node 50-2, and node 50-n via network 20. In other embodiments, DHCP server 30 may represent a server computing environment utilizing multiple computers as a server system, such as in a cloud computing environment. In another embodiment, DHCP server 30 represents a computing environment utilizing clustered computers and components to act as a single pool of seamless resources. In an embodiment, DHCP server 30 includes DHCP program 32, user interface (UI) 34, and information repository 36. DHCP server 30 may include components as depicted and described in further detail with respect to FIG. 3.

In an embodiment, DHCP program 32 operates to prevent data corruption by invalidating the Internet protocol (IP) lease of a faulty node. In an embodiment, DHCP program 32 monitors network 20 to determine if any node in network 20 has an active connection to DHCP server 30. In an embodiment, DHCP program 32 determines node 50-1 has an active connection to DHCP server 30 if DHCP program 32 receives an indication of a heartbeat from node 50-1. In an embodiment, a heartbeat is a signal that is generated intermittently by hardware or software to indicate normal operation or to synchronize other parts of a system. Typically, a heartbeat is sent between computing devices at a regular time interval (e.g., every five seconds). In an embodiment, if DHCP program 32 does not receive an indication of a heartbeat from a node within a determined period of time (e.g., a few heartbeat intervals), DHCP program 32 determines that the node is faulty, has lost communication with DHCP server 30 (DHCP program 32) and/or left network 20. In an embodiment, the parity bit of a node without a heartbeat is set to zero by DHCP program 32. In an embodiment, DHCP program 32 does not assign or renew an IP lease to a node with a parity bit set to zero. In an embodiment, DHCP program 32 assigns an IP lease to a node that requests an IP lease. In an embodiment, DHCP program 32 assigns or renews an IP lease to a node with a parity bit set to one. The IP lease includes an IP address and network configurations (e.g., the date and time an IP lease expires). In an embodiment, DHCP program 32 transfers resources of a node with a parity bit of zero to another node that has a parity bit of one.

UI 34 operates on DHCP server 30 to visualize content, such as menus and icons, and to allow a user to interact with an application accessible to DHCP server 30. In an embodiment, UI 34 comprises an interface to DHCP program 32. UI 34 may display data received from DHCP program 32 and send input received from a user of DHCP server 30 to DHCP program 32. In other embodiments, UI 34 may comprise one or more interfaces such as, an operating system interface and/or application interfaces. In example embodiments, a user of DHCP server 30, via UI 34, communicates with DHCP program 32.

A user interface, as shown by UI 34, is a program that provides an interface between a user and an application. A user interface refers to the information (such as graphic, text, and sound) a program presents to a user and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. The actions in GUIs are often performed through direct manipulation of the graphics elements.

In an embodiment, information repository 36 is a repository that may be written to and/or read by DHCP program 32, node 50-1, node 50-2, and node 50-n. In an embodiment, information repository 36 stores data such as parity bit information and parameters of an assigned IP lease (e.g. IP address and an expiration date and time for the IP address). In an embodiment, a parity bit is a bit added to the end of a string of binary code. The parity bit indicates whether the number of bits in the string are an odd or an even number of bits. In an embodiment, parity bits are used to identify errors. In an embodiment, a parity bit of zero indicates a node with an invalid IP lease, an unreachable node, and/or a faulty node. In another embodiment, a parity bit of one indicates a node with a valid IP lease and/or a properly functioning node. In an embodiment, nodes with a parity bit of zero cannot write to information repository 36. In an embodiment, nodes with a parity bit of one can write to information repository 36. In some embodiments, information repository 36 resides on DHCP server 30. In other embodiments, information repository 36 may reside on another server, or another computing device, provided that information repository 36 is accessible to DHCP program 32, node 50-1, node 50-2, and node 50-n over network 20.

Information repository 36 may be implemented using any volatile or non-volatile storage media for storing information, as known in the art. For example, information repository 36 may be implemented with a tape library, optical library, one or more independent hard disk drives, or multiple hard disk drives in a redundant array of independent disks (RAID). Similarly, information repository 36 may be implemented with any suitable storage architecture known in the art, such as a relational database, an object-oriented database, or one or more tables.

Computing device 40 may be a desktop computer, laptop computer, tablet computer, personal digital assistant (PDA), or smart phone. In general, computing device 40 may be any electronic device or computing system capable of executing computer readable program instructions, and communicating with computing device 40 and DHCP server 30 over network 20. In an embodiment, computing device 40 includes information repository 46. In an embodiment, computing device 40 may include resources, such as a hard drives, portions of hard drives, tape drives, storage area networks, any data storage devices, software, internet protocol resources, Ethernet interfaces, vitalized addresses, etc, that are resources that are controlled by node 50-1, node 50-2, and/or node 50-n. Computing device 40 may include components as depicted and described in further detail with respect to FIG. 3.

In an embodiment, information repository 46 is a repository that may be written to and/or read by DHCP program 32, node 50-1, node 50-2, and node 50-n. In an embodiment, information repository 46 stores data that is written by nodes in network 20. In an embodiment, a node is responsible for writing specific data to information repository 46. If more than one node writes the same data to information repository 42, that data will have more than one owner, which results in great risk for data corruption. Data corruption can occur from when duplicate information (i.e., redundant information) or conflicting information is stored to information repository 42. In an embodiment, nodes with a valid IP lease, which is assigned by DHCP program 32, can write data to information repository 46. In an embodiment, nodes with a valid IP lease have a parity bit of one (i.e., the parity bit of the node is set to one). In an embodiment, in the event of a faulty node or a cluster split, DHCP program 32 or a node manager invalidates the IP lease time of one or more nodes in the node cluster. In an embodiment, nodes with expired or invalid IP leases have a parity bit of zero (i.e., the parity bit of the node is set to zero). In an embodiment, DHCP program 32 modifies the parity bits of the nodes in network 20 and stores the bit information to information repository 46. In some embodiments, DHCP program 32 or a node manager transfers the resources of an invalidated node to one or more other nodes in the node cluster. In an embodiment, invalidating the least time of one or more nodes prevents the node(s) from writing to information repository 46, hence, preventing corruption of data. In some embodiments, information repository 46 resides on computing device 40. In other embodiments, information repository 46 may reside on another server, or another computing device, provided that information repository 46 is accessible to DHCP program 32, node 50-1, node 50-2, and node 50-n over network 20.

Information repository 46 may be implemented using any volatile or non-volatile storage media for storing information, as known in the art. For example, information repository 46 may be implemented with a tape library, optical library, one or more independent hard disk drives, or multiple hard disk drives in a redundant array of independent disks (RAID). Similarly, information repository 46 may be implemented with any suitable storage architecture known in the art, such as a relational database, an object-oriented database, or one or more tables.

In an embodiment, node 50-1 is a computing device that writes data to information repository 46. In an embodiment, node 50-1 broadcasts a request to DHCP program 32 requesting a new IP lease. In another embodiment, node 50-1 broadcasts a request to DHCP program 32 requesting an IP lease renewal for an existing IP lease. In an embodiment, node 50-1 communicates with node 50-2 and nodes 50-n. In an embodiment, nodes in the cluster know the parity bit number of node(s) in network 20. For example, node 50-2 and node 50-n have parity bits of zero. Node 50-1 is aware that node 50-2 and node 50-n have parity bits of zero. Therefore, node 50-1 knows that node 50-2 and node 50-n cannot write data to information repository 46. In an embodiment, a node invalidates the lease time of any other node by setting the respective parity bit to zero. For example, node 50-1 is the resource owner of critical data. Node 50-2 and node 50-n lose contact with node 50-1 (i.e., node 50-1 no longer receives an indication of a heartbeat from node 50-2 or node 50-n). To prevent corruption of the critical data that is being written by node 50-1, node 50-1 requests DHCP program 32 to set the respective parity bits of node 50-2 and node 50-n to zero. Setting the respective parity bits of node 50-1 and node 50-n to zero prevents node 50-1 and/or node 50-n from writing data, particular the same data as node 50-1, to information repository 46. In another example, when node 50-1 and node 50-2 are both resource owners and they lose contact with each other, to prevent corruption of data being written by both nodes without any coordination, either node can indicate to DHCP program 32 to set the parity bit of the other node to zero so that the first node will be the only resource owner. In an embodiment, a node with an expired IP lease time reboots. In an embodiment, a node with a parity bit of one can renew the existing IP lease. In an embodiment, node-n represents any number of nodes (e.g. one or ten). In an embodiment, node 50-1, node 50-2, and node 50-n have similar functions.

In an embodiment, node 50-1 may be a desktop computer, laptop computer, tablet computer, personal digital assistant (PDA), or smart phone. In general, node 50-1 may be any electronic device or computing system capable of executing computer readable program instructions, and communicating with DHCP server 30, computing device 40, node 50-2, and node 50-n over network 20. In other embodiments, node 50-1 may represent a server computer system utilizing multiple computers as a server system, such as in a cloud computer environment. In an embodiment, node 50-2 and node 50-n may be substantially similar to node 50-1. Node 50-1 may include components as depicted and described in further detail with respect to FIG. 3.

Figure 2:
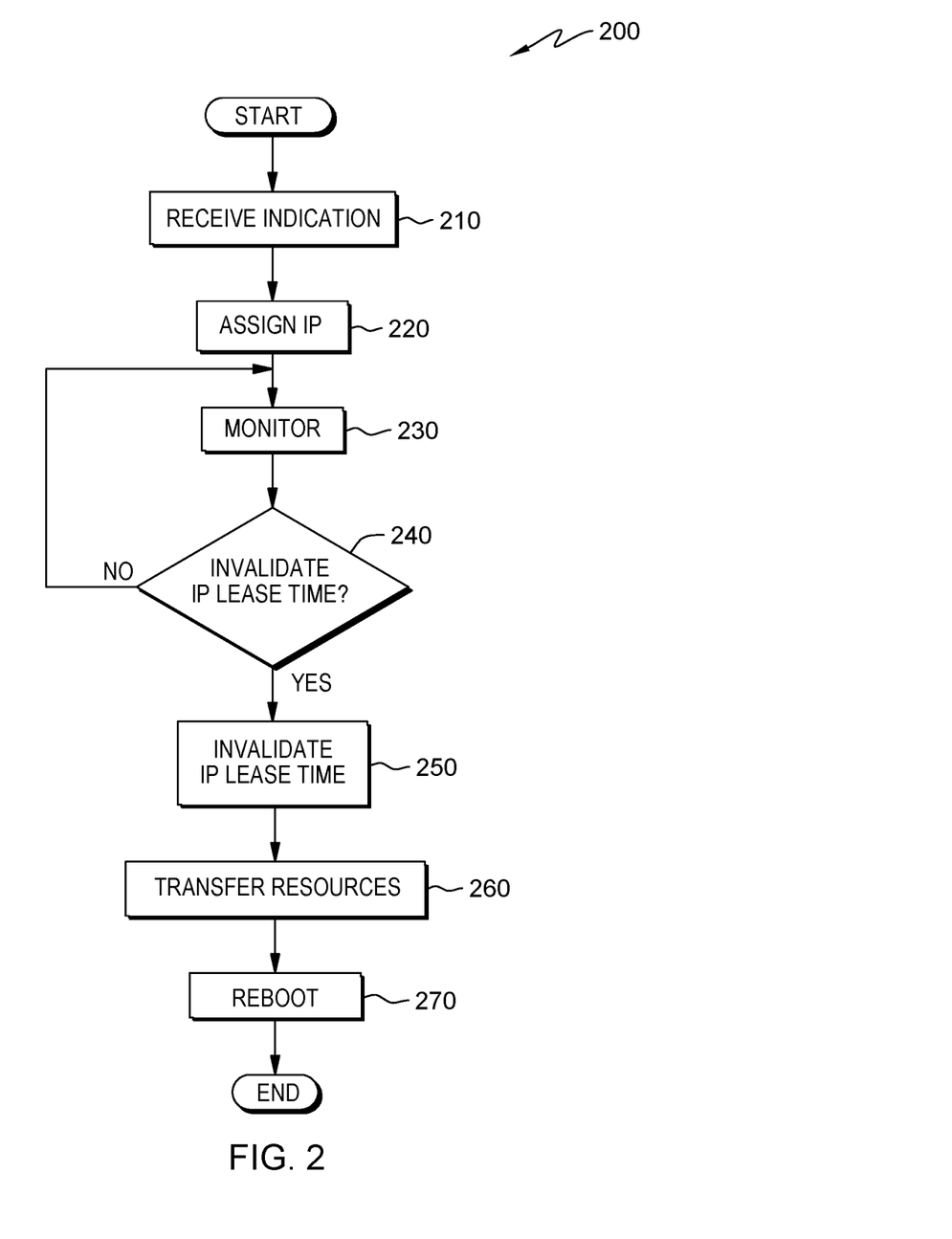
FIG. 2 a flowchart of operational steps of a program for preventing data corruption.

FIG. 2 depicts a flowchart of operational steps 200 of DHCP program 32 executing within the computing environment of FIG. 1, in accordance with an embodiment of the present invention. DHCP program 32 operates to prevent the corruption of data written by nodes in a cluster. In an embodiment, the steps of the workflow are performed by DHCP program 32. Alternatively, steps of the workflow can be performed by any other program while working with DHCP program 32. In an embodiment, a node may invoke operational steps 200 by requesting an IP lease, requesting the renewal of an IP lease, or requesting that the parity bit of another node be set to zero from DHCP program 32. In an embodiment, operational steps 200 may additionally be invoked if a node loses connection with network 20, reboots, or becomes faulty (i.e., experiences failure).

In an embodiment, DHCP program 32 receives an indication that node 50-1 is requesting an IP lease. In an embodiment, the IP lease includes network parameters such as an IP address and the length of time the IP lease is valid. An IP address lease is valid for a determined amount of time chosen by DHCP program 32. In another embodiment, an IP address lease is valid for a time indicated by a user to DHCP program 32. In yet another embodiment, an IP address lease is valid for a time less than or equal to a node down detection time. A node down detection time is the time in which a node is checked to determine if it is working correctly or down. In an embodiment, before the IP lease expires, node 50-1 requests to renew the IP lease. In an embodiment, the IP lease is invalid if the IP lease has expired. Node 50-1 cannot connect to network 20 with an invalid IP lease. DHCP program 32 monitors network 20 for nodes with an invalid IP lease to prevent the corruption of data stored to information repository 46. In an embodiment, DHCP program 32 sets the parity bit of a node that is functioning properly to "1" and a node that is not functioning properly (i.e., down), to "0".

In step 210, DHCP program 32 receives an indication of an IP lease request from node 50-1. In an embodiment, the request is for a new IP lease. In another embodiment, the request is to renew an existing IP lease. In an embodiment, DHCP program 32 receives the request from a node that sends a broadcast message requesting the IP lease.

In step 220, DHCP program 32 assigns an IP address to node 50-1. In an embodiment, DHCP program 32 assigns the IP address to node 50-1 in the form of a message that includes configuration information for the IP lease. Configuration information includes, but is not limited to, the IP address, a media access control (MAC) address, a domain name, and a lease for the IP address. In an embodiment, the IP lease is for a specified timeframe, which requires renewal before the expiration of the lease. In an embodiment, an expired IP lease is invalid and non-functional. For example, the IP lease for node 50-1 expired. Node 50-1 cannot connect to network 20 with the expired lease. To rejoin network 20, node 50-1 requests a new IP lease from DHCP program 32. In an embodiment, DHCP assigns a new IP lease or renews an existing IP lease if DHCP program 32 receives an IP lease request from a node with a parity bit of one. In an embodiment, DHCP program 32 does not assign a new IP lease or renew an existing IP lease if the parity bit of the node is set to zero. In an embodiment, a node with a parity bit of one is allowed to write data to information repository 46. In an embodiment, a node with a parity bit of zero is unable/not allowed to write data to information repository 46.

In step 230, DHCP program 32 monitors network 20. In an embodiment, DHCP program 32 monitors network 20 for nodes that are not actively communicating with DHCP program 32. In an embodiment, DHCP program 32 determines node 50-1 is actively communicating with DHCP program 32 if DHCP program 32 receives an indication of a heartbeat from node 50-1. In an embodiment, a heartbeat is a signal that is generated intermittently by hardware or software to indicate normal operation or to synchronize other parts of a system. Typically, a heartbeat is sent between computing devices at a regular time interval (e.g., every five seconds). In an embodiment, if DHCP program 32 does not receive a heartbeat from node 50-1 within a determined period of time (e.g., a few heartbeat intervals), DHCP program 32 determines that node 50-1 is faulty and/or left network 20.

In decision block 240, DHCP program 32 determines if the IP lease for node 50-1 should be invalidated. In an embodiment, DHCP program 32 determines that the IP lease assigned to node 50-1 should be invalidated if the IP lease expired. In another embodiment, DHCP program 32 determines that the IP lease assigned to node 50-1 should be invalidated if DHCP program 32 does not receive a heartbeat from node 50-1 within a determined time frame. In an embodiment, a node without a heartbeat indicates that the node is faulty and/or lost connection with DHCP program 32.

If DHCP program 32 determines that the IP lease for node 50-1 should not be invalidated (decision block 240, no branch), DHCP program 32 continues to monitor network 20 (step 230). In an embodiment, DHCP program 32 does not invalidate the IP lease of nodes that have a heartbeat. For example, functioning nodes (i.e., not faulty) connected to network 20. In another embodiment, DHCP program 32 does not invalidate current (i.e., not expired) IP leases of nodes.

If DHCP program 32 determines that the IP lease for node 50-1 should be invalidated (decision block 240, yes branch), DHCP program 32 invalidates the IP lease (step 250). In an embodiment, DHCP program 32 invalidates the IP lease of node 50-1 by setting the parity bit (not shown) of node 50-1 to zero. A parity bit is a bit added to the end of a string of binary code. The parity bit indicates whether the number of bits in the string are an odd or an even number of bits. In an embodiment, parity bits are used to identify errors. In an embodiment, a parity bit of zero indicates an invalid IP lease, an unreachable node, and/or a faulty node. In another embodiment, a parity bit of one indicates a valid IP lease and/or a properly functioning node.

In an embodiment, nodes in network 20 can detect if another node in network 20 is faulty by identifying the parity bit of another node. In an embodiment, nodes in network 20 set the parity bit of a faulty node to zero. For example, node 50-1, node 50-2, and node 50-n are in network 20. Node 50-1 is the resource owner of data written to information repository 46. Node 50-1, node 50-2, node 50-n lose contact and can no longer communicate with one another. Node 50-1 requests DHCP program 32 to set the respective parity bits of node 50-2 and node 50-n to zero to prevent node 50-2 and node 50-n from writing to information repository 46. In an embodiment, DHCP program 32 and node 50-1 invalidate IP leases to prevent data corruption. For example, if node 50-1, node 50-2, and node 50-3 lose contact with one another, each node will assume the other nodes are faulty. As a result, each node writes data to information repository 46, resulting in corruption of the data.

In step 260, DHCP program 32 transfers the resources of node 50-1. In other words, DHCP program 32 transfers the control of resources found on computing device 40 (i.e., information repository 46) from node 50-1 to any other node. Here, new resources being transferred to the new node may now only be controlled by the new node. In an embodiment, DHCP program 32 changes the parity bit of the new nodes with control (i.e. node 50-2) to a parity bit of one for the control of the resources.

In step 270, DHCP program 32 causes node 50-1 to reboot. In an embodiment, when node 50-1 reboots, the parity bit of node 50-1 remains zero until a user of DHCP server 30 changes the parity bit of node-1 from zero to one. For example, Node 50-1 experiences a failure and reboots. Upon rebooting, DHCP program 32 sends an indication to node 50-1 that the IP lease of node 50-1 has expired and is therefore invalid. The parity bit of node 50-1 remains zero until the user of DHCP server 30 is notified and changes the parity bit to one after the issue has been resolved. When DHCP program 32 causes node 50-1 to reboot, other nodes (i.e. node 50-2, node 50-n) can acquire the resources of node 50-1, discussed previously. Upon the reboot of node 50-1, the parity bit of node 50-1 is changed to one and node 50-1 may reacquire the resources that were assigned to node 50-1 previously.

In an example, Node A, Node B, and Node C are in network 20. Node A no longer detects a heartbeat from Node B and Node C, which indicates that Node B and Node C have lost connection with Node A. DHCP program 32 receives a request from Node A to set the parity bit of Node B and Node C to zero, invalidating the IP lease time of Node B and Node C. After the respective parity bits of Node B and Node C are set to zero, Node B and Node C realize that their respective IP leases are invalid when Node B and Node C attempt to renew their respective IP lease times. Node B and Node C reboot.

In another example, Node A loses contact with the server, Node B, and Node C in network 20. DHCP program 32 no longer detects a heartbeat from Node A and sets the parity bit of Node A to zero. Node A is no longer able to request IP lease time renewal. DHCP program 32 transfers resource ownership that belonged to Node A to Node B and Node C, which have their parity bits set to one. Node A returns to the network and discovers Node A has an expired IP lease time and also that Node A has a parity bit of zero. Node A reboots.

Figure 3:
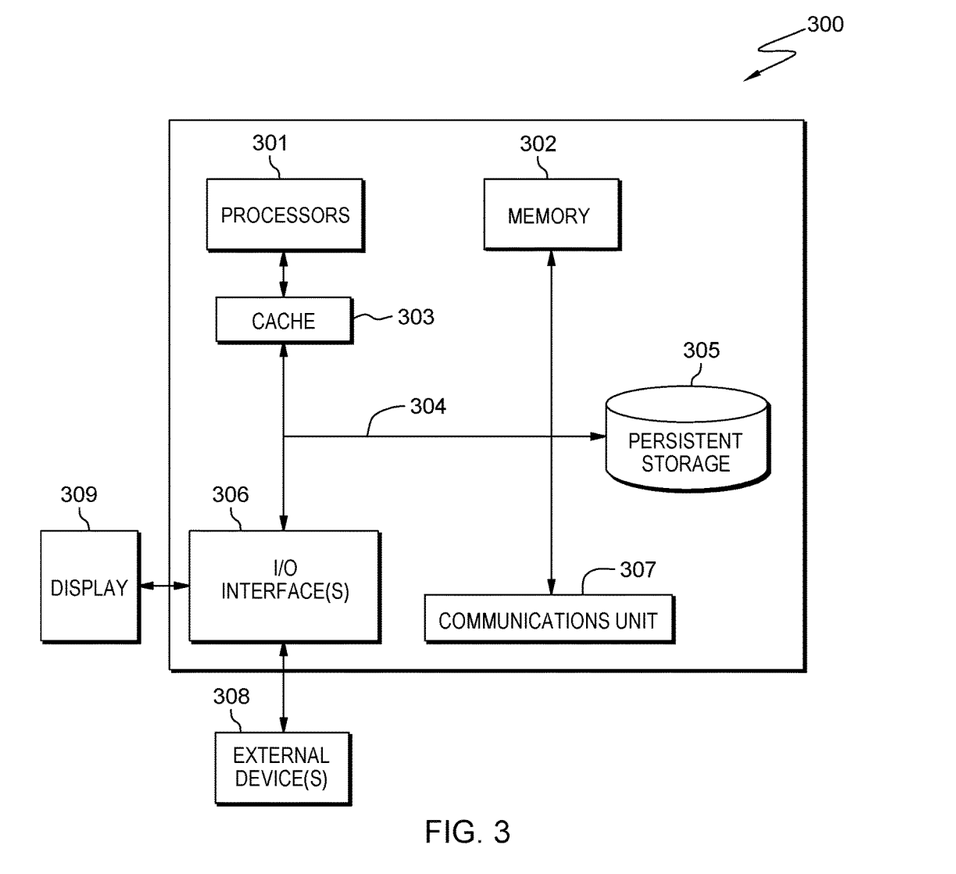
FIG. 3 depicts a block diagram of components of the computing device of FIG. 1, in accordance with an embodiment of the present invention.

FIG. 3 depicts computer system 300, which is an example of a system that includes DHCP program 32. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage x05 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for preventing data corruption, the method comprising the steps of:
    determining, by one or more computer processors, a two or more nodes in a cluster, wherein the cluster manages one or more resources found on a device;
    receiving, by the one or more computer processors, an indication from a first node of the two or more nodes, wherein the indication includes a request for an IP lease for the first node;
    determining, by the one or more computer processors, a first parity bit setting for the first node, wherein the first parity bit setting is stored in a parity bit, and wherein the parity bit is added to an end of a string of binary code;
    responsive to determining the parity bit setting of the first node being set to one, indicating, by the one or more computer processors, an IP lease to the first node;
    receiving, by the one or more computer processors, an indication from a second node, wherein the indication is a second parity bit setting for the second node, and wherein the second parity bit setting is set to zero; and
    responsive to receiving the indication from the second node, transferring, by the one or more computer processors, a resource of the second node to a transfer node of the two or more nodes, wherein the transfer node has a transfer parity bit setting, and wherein the transfer parity bit setting is set to one.

2. The method of claim 1, further comprising:
    determining, by the one or more computer processors, whether an IP lease for a node of the two or more nodes has expired;
    responsive to determining an IP lease for the node of the two or nodes has expired, indicating, by the one or more computer processors, a parity bit setting of the node being set to zero.

3. The method of claim 1, further comprising:
    determining, by the one or more computer processors, whether a node of the two or more nodes does not have a heartbeat; and
    responsive to determining the node of the two or more nodes does not have a heartbeat, indicating, by the one or more computer processors, the parity bit setting of the node being set to zero.

4. The method of claim 3, wherein a heartbeat is a signal between the two or more nodes that indicates synchronization between the two or more nodes.

5. The method of claim 1, wherein the IP lease includes a date and a time the IP lease expires.

6. A computer program product for preventing data corruption, the computer program product comprising:
    one or more computer readable storage media; and
    program instructions stored on the one or more computer readable storage media, the program instructions comprising:
        program instructions to determine a two or more nodes in a cluster, wherein the cluster manages one or more resources found on a device;
        program instructions to receive an indication from a first node of the two or more nodes, wherein the indication includes a request for an IP lease for the first node;
        program instructions to determine a parity bit setting for the first node, wherein a parity bit setting is stored in a parity bit, and wherein a parity bit is added to an end of a string of binary code;
        program instructions, responsive to determining the parity bit setting of the first node being set to one, to indicate an IP lease to the first node;
        program instructions to receive an indication from a second node, wherein the indication is a second parity bit setting for the second node, and wherein the second parity bit setting is set to zero; and
        program instructions, responsive to receiving the indication from the second node, to transfer a resource of the second node to a transfer node of the two or more nodes, wherein the transfer node has a transfer parity bit setting, and wherein the transfer parity bit setting is set to one.

7. The computer program product of claim 6, further comprising program instructions, stored on the one or more computer readable storage media, to:
    determine whether an IP lease for a node of the two or more nodes has expired; and
    responsive to determining an IP lease node for the node of the two or more nodes has expired, indicate a parity bit setting of the node being set to zero.

8. The computer program product of claim 6, further comprising program instructions, stored on the one or more computer readable storage media, to:
    determine whether a node of the two or more nodes does not have a heartbeat; and
    responsive to determining the node of the two or more nodes does not have a heartbeat, indicate the parity bit setting of the node being set to zero.

9. The computer program product of claim 8, wherein a heartbeat is a signal between the two or more nodes that indicate synchronization between the two or more nodes.

10. The computer program product of claim 6, wherein the IP lease includes a date and a time the IP lease expires.

11. A computer system for preventing data corruption, the computer system comprising:
    one or more computer processors;
    one or more computer readable storage media; and
    program instructions stored on the one or more computer readable storage media for execution by the one or more computer processors, the program instructions comprising:
        program instructions to determine a two or more nodes in a cluster, wherein the cluster manages one or more resources found on a device;
        program instructions to receive an indication from a first node of the two or more nodes, wherein the indication includes a request for an IP lease for the first node;

program instructions to determine a parity bit setting for the first node, wherein a parity bit setting is stored in a parity bit, and wherein a parity bit is added to an end of a string of binary code;

program instructions, responsive to determining the parity bit setting of the first node being set to one, to indicate an IP lease to the first node;

program instructions to receive an indication from a second node, wherein the indication is a second parity bit setting for the second node, and wherein the second parity bit setting is set to zero; and program instructions, responsive to receiving the indication from the second node, to transfer a resource of the second node to a transfer node of the two or more nodes, wherein the transfer node has a transfer parity bit setting, and wherein the transfer parity bit setting is set to one.

12. The computer system of claim 11, further comprising program instructions stored on the one or more computer readable storage media for execution by the one or more computer processors, to:

determine whether an IP lease for a node of the two or more nodes has expired; and responsive to determining an IP lease node for the node of the two or more nodes has expired, indicate a parity bit setting of the node being set to zero.

13. The computer system of claim 11, further comprising program instructions stored on the one or more computer readable storage media for execution by the one or more computer processors, to:

determine whether a node of the two or more nodes does not have a heartbeat; and responsive to determining the node of the two or more nodes does not have a heartbeat, indicate the parity bit setting of the node being set to zero.

14. The computer system of claim 13, wherein a heartbeat is a signal between the two or more nodes that indicate synchronization between the two or more nodes.

* * * * *